United States Patent
Schramm et al.

(10) Patent No.: US 10,100,170 B2
(45) Date of Patent: Oct. 16, 2018

(54) COMPOSITION, CONNECTOR, PROCESS FOR IMPROVING BONDING BETWEEN TWO OR MORE MEANS FOR CONVEYING FLUIDS, AND SYSTEM FOR CONVEYING FLUIDS

(71) Applicant: Dow Global Technologies LLC, Midland, MI (US)

(72) Inventors: Detlef Schramm, Waedenswil (CH); Rudolf J. Koopmans, Einsiedeln (CH); Luis G. Zalemea Bustillo, Richterswil (CH)

(73) Assignee: Dow Global Technologies LLC, Midland, MI (US)

( * ) Notice: Subject to any disclaimer, the term of this patent is extended or adjusted under 35 U.S.C. 154(b) by 690 days.

(21) Appl. No.: 14/428,402

(22) PCT Filed: Sep. 20, 2013

(86) PCT No.: PCT/US2013/060792
§ 371 (c)(1),
(2) Date: Mar. 16, 2015

(87) PCT Pub. No.: WO2014/052172
PCT Pub. Date: Apr. 3, 2014

(65) Prior Publication Data
US 2015/0368427 A1 Dec. 24, 2015

Related U.S. Application Data

(60) Provisional application No. 61/706,966, filed on Sep. 28, 2012.

(51) Int. Cl.
*F16L 47/02* (2006.01)
*C08K 5/00* (2006.01)
(Continued)

(52) U.S. Cl.
CPC .............. *C08K 5/0008* (2013.01); *C08K 3/01* (2018.01); *C08K 3/34* (2013.01); *C08K 3/36* (2013.01);
(Continued)

(58) Field of Classification Search
CPC ....... C08K 2201/01; C08K 3/34; F16L 47/02; F16L 13/103; F16L 47/20; B29C 65/3668
See application file for complete search history.

(56) References Cited

U.S. PATENT DOCUMENTS 3,676,273 A * 7/1972 Graves ................... B05D 3/207
264/108
3,923,580 A * 12/1975 Leatherman ........ B29C 66/1122
156/245
(Continued)

FOREIGN PATENT DOCUMENTS

WO WO2008148588 12/2008
WO WO2010063557 6/2010

OTHER PUBLICATIONS

Chinese Response to Office Action dated Feb. 8, 2017; from counterpart Chinese Application No. 201380061611.0.
(Continued)

*Primary Examiner* — David Bochna
(74) *Attorney, Agent, or Firm* — Husch Blackwell LLP

(57) ABSTRACT

A composition comprising: (a) a thermoplastic polymer; (b) a plurality of particles, each said particle having core-shell structure and comprising, (i) a core comprising one or more magnetic materials and (ii) a shell comprising silicon dioxide; wherein the composition comprises particles (b) in an amount from 2 to 15 wt % is provided. Further provided is a connector comprising the composition, a system comprising the connector and a process for improving bonding between two or more means for conveying fluids.

8 Claims, 2 Drawing Sheets

(51) Int. Cl.
*C08K 3/34* (2006.01)
*C08K 3/36* (2006.01)
*F16L 13/02* (2006.01)
*C08K 3/01* (2018.01)
*F16L 13/10* (2006.01)

(52) U.S. Cl.
CPC .......... *F16L 13/02* (2013.01); *C08K 2201/01* (2013.01); *F16L 13/103* (2013.01); *F16L 47/02* (2013.01)

(56) References Cited

U.S. PATENT DOCUMENTS

| | | | | |
|---|---|---|---|---|
| 4,035,547 | A * | 7/1977 | Heller, Jr. | B29C 66/712 156/272.4 |
| 4,571,472 | A * | 2/1986 | Pollack | B23K 13/00 156/274.2 |
| 4,749,833 | A * | 6/1988 | Novorsky | B29C 65/7802 156/272.4 |
| 4,770,735 | A * | 9/1988 | Shaposka | A61M 39/146 156/258 |
| 5,143,987 | A * | 9/1992 | Hansel | C08G 18/40 525/452 |
| 5,254,824 | A * | 10/1993 | Chamberlain | B29C 65/1425 156/272.2 |
| 5,338,611 | A * | 8/1994 | Lause | B29C 65/1425 156/272.2 |
| 5,503,192 | A * | 4/1996 | Platusich | B29C 65/3612 138/112 |
| 5,714,238 | A * | 2/1998 | Komagata | C08G 65/327 156/330 |
| 5,736,719 | A * | 4/1998 | Lawson | B29C 65/04 156/274.4 |
| 5,833,795 | A * | 11/1998 | Smith | B29C 73/02 156/272.4 |
| 6,056,844 | A * | 5/2000 | Guiles | B29C 35/08 156/272.4 |
| 6,855,760 | B1 * | 2/2005 | Kirsten | C09J 5/00 252/62.51 R |
| 7,147,742 | B2 * | 12/2006 | Kirsten | B29C 35/08 156/272.2 |
| 7,407,704 | B2 * | 8/2008 | Kirsten | C09J 5/02 156/711 |
| 7,569,624 | B2 * | 8/2009 | Kolbe | C08J 9/10 523/200 |
| 7,984,738 | B2 * | 7/2011 | LaMarca | H01F 1/26 156/272.2 |
| 8,424,924 | B2 * | 4/2013 | LaMarca | B29C 65/3668 285/21.1 |
| 8,448,992 | B2 * | 5/2013 | Min | A61M 39/143 156/272.2 |
| 9,199,070 | B2 * | 12/2015 | Wegener | A61M 39/14 |
| 9,446,574 | B2 * | 9/2016 | Zimmerer | B29C 65/362 |
| 9,528,638 | B2 * | 12/2016 | Hooberman | B29C 65/3656 |
| 2004/0249037 | A1 | 12/2004 | Kolbe et al. | |
| 2005/0039848 | A1 | 2/2005 | Kristen | |
| 2006/0091887 | A1 * | 5/2006 | Aisenbrey | A01K 3/005 324/323 |
| 2006/0216441 | A1 * | 9/2006 | Schubel | B41M 5/267 428/13 |
| 2006/0249705 | A1 * | 11/2006 | Wang | A61L 29/18 252/62.51 C |
| 2007/0200342 | A1 * | 8/2007 | Roberts-Moore | B29C 65/3668 285/288.1 |
| 2008/0187697 | A1 * | 8/2008 | Amano | B29C 65/1635 428/35.7 |
| 2010/0072742 | A1 * | 3/2010 | LaMarca | B29C 65/3668 285/21.2 |
| 2010/0206418 | A1 * | 8/2010 | Wolf | F16L 13/103 138/109 |
| 2015/0094426 | A1 * | 4/2015 | Conrad | C09J 127/06 525/178 |

OTHER PUBLICATIONS

Chinese Office Action dated Oct. 18, 2016; from Chinese counterpart Application No. 201380061611.0.
Chinese Office Action dated Apr. 14, 2016; from Chinese counterpart Application No. 201380061611.0.
EP Office Action dated Jun. 7, 2016; from EP counterpart Application No. 13771026.5.
EP Response to Office Action dated Oct. 5, 2016; from EP counterpart Application No. 13771026.5.
PCT/US2013/060792 International Search Report and Written Opinion dated Jan. 1, 2014, 7 pages.
PCT/US2013/060792 International Preliminary Report on Patentability dated Apr. 9, 2015, 6 pages.
European Patent Application No. 13771026.5 Communication under Rule 161/162 dated May 11, 2015, 3 pages.

* cited by examiner

COMPOSITION, CONNECTOR, PROCESS FOR IMPROVING BONDING BETWEEN TWO OR MORE MEANS FOR CONVEYING FLUIDS, AND SYSTEM FOR CONVEYING FLUIDS

FIELD OF INVENTION

The instant invention relates to a composition, connector, process for improving bonding between two or more means for conveying fluids and a system for conveying fluids.

BACKGROUND OF THE INVENTION

The most common way of connecting pipes or tubing sections, collectively, "means for conveying fluids," is with mechanical fittings, welding and friction welding. Fittings are particularly relied upon to connect sections of multilayer pipes which are used for industrial applications, including for example oilfield uses. Polyolefins are currently used in producing a wide range of pipes having a wide range of diameters. In the larger diameter pipes (typically, greater than or equal to 25 mm outside diameter), the cost for the fittings and the equipment to fix the fittings prevent the use of multilayer pipes system from being economically competitive.

For monolithic pipe systems of non-crosslinked materials, welding fittings are typically used. The challenge for multilayer pipe is that it is necessary to weld the fitting inside and outside to the pipe surface. Currently, the most commonly used process to make such welds is heat transfer by induction or infrared heating. Unfortunately these technologies rely and depend on a perfect heat transfer throughout the entire structure and a steel layer in the structure. In many instances such structures contain actual heat barrier materials. Moreover, the polymers used in multilayer pipes typically have very poor heat transfer capability. The heating time needed to reach temperatures sufficient to form an acceptable weld is dependent upon the thickness of the pipe and/or fitting as well as the diameter of the pipe. Such heating times may range from about 15 minutes up to over one hour. In addition, the connection of pipes or tubing sections made of different materials frequently leak due to different coefficients of expansion of the different materials.

A fast and reliable connector and process of connecting two or more means for conveying fluids would be beneficial in those industries using such means.

SUMMARY OF THE INVENTION

The instant invention is a composition, a connector, a system comprising said connector and a process for improving bonding between two or more means for conveying fluids.

In one embodiment, the instant invention provides a composition comprising: (a) a thermoplastic polymer; (b) a plurality of particles, each said particle having a core shell structure and comprising (i) a core comprising one or more magnetic materials and (ii) a shell comprising silicon dioxide; wherein the composition comprises the plurality of particles (b) in an amount from 2 to 15 wt %.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
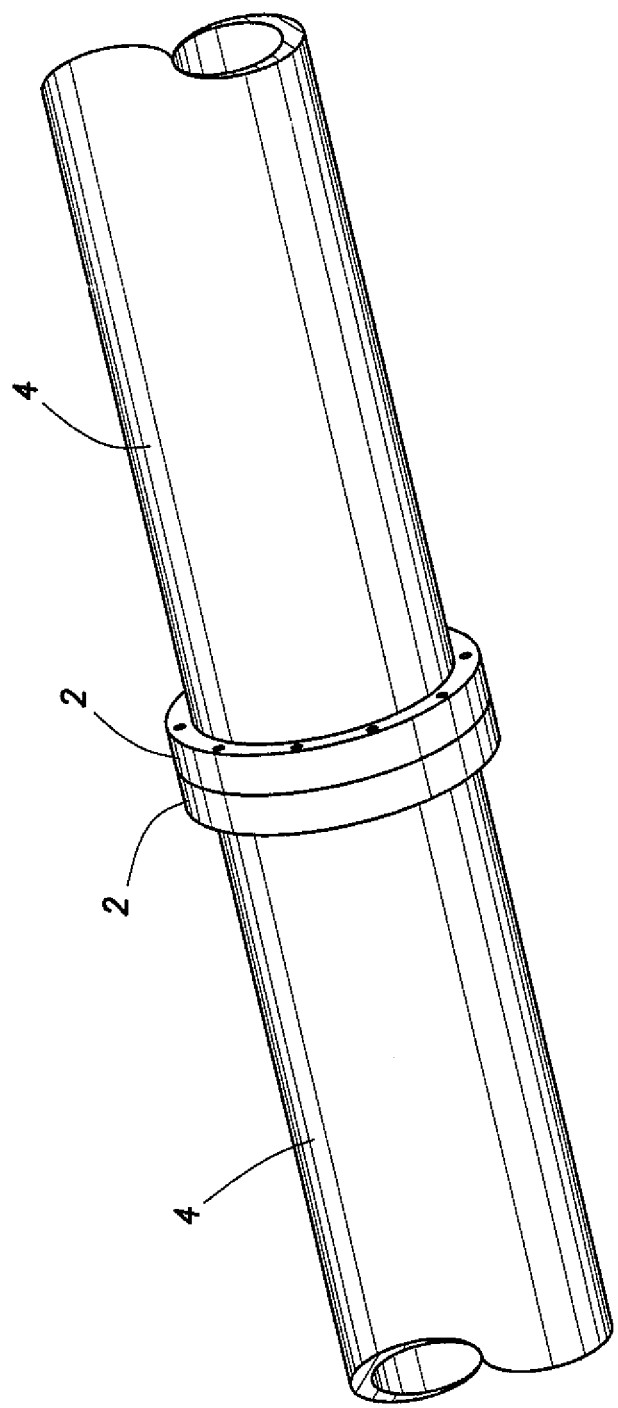
FIG. 1 is a schematic of a connector according to a first embodiment of the invention.

The instant invention is a composition, method of producing the same, articles made therefrom, and methods for making such articles.

The composition according to the present invention comprises: (a) a thermoplastic polymer; (b) a plurality of particles, each said particle having core-shell structure and comprising, (i) a core comprising one or more magnetic materials and (ii) a shell comprising silicon dioxide; wherein the composition comprises particles (b) in an amount from 2 to 15 wt %.

Any thermoplastic polymer suitable for use as a means for conveying fluids and/or for connecting such means may be used in the composition. For example, thermoplastic polymers useful in the composition include polymers containing units derived from olefins, functionalized olefins, vinyl chloride, styrene, amides, imides, sulfones, (meth)acrylates, and combinations of two or more thereof. Blends of two or more such thermoplastic polymers are further included in the thermoplastic polymers useful in the composition.

All individual values and subranges from 2 to 15 wt % are included herein and disclosed herein; for example, the amount of particles (b) in the composition can be from a lower limit of 2, 3, 5, 7, 9, 11, 13, or 14 wt % to an upper limit of 6, 8, 10, 12, 14 or 15 wt %. For example, the amount of particles (b) in the composition may be in the range of from 2 to 15 wt %, or in the alternative, the amount of particles (b) in the composition may be in the range of from 7.5 to 12.5 wt %, or in the alternative, the amount of particles (b) in the composition may be in the range of from 5 to 7.5 wt %, or in the alternative, the amount of particles (b) in the composition may be in the range of from 9 to 15 wt %, or in the alternative, the amount of particles (b) in the composition may be in the range of from 2 to 5 wt %., or in the alternative, the amount of particles (b) in the composition may be in the range of from 2 to 3 wt %.

For the purposes of the invention, particles with a core-shell structure are particles which are: (i) isolated individual cores surrounded by a shell, (ii) aggregates of accreted cores, where the aggregates have been surrounded by a shell and/or (iii) aggregates accreted by way of the shells. Aggregates are individual particles firmly accreted, for example by way of sinter necks. While a "diameter" of a particle having a core-shell structure may be discussed herein, it will be understand that such particles are not necessarily spherical in shape. Rather, such particles may have other regular or irregular shapes. In the instance of nonpsherical particles, the term "diameter" refers to the largest dimension transecting a centerpoint, or approximate centerpoint, of the particle.

In an alternative embodiment, the instant invention further provides a connector, wherein at least a portion of the connector comprises: a composition which comprises (a) a thermoplastic polymer; (b) a plurality of particles, each said particle having a core shell structure and comprising (i) a core comprising one or more magnetic materials and (ii) a shell comprising silicon dioxide; wherein the composition comprises particles (b) in an amount from 2 to 15 wt %.

As used herein, the term "connector" means any device to connect two or more means for conveying fluids, to change fluid flow direction, to connect different sizes of means for conveying fluids, to adapt and connect different shapes of means for conveying fluids, and/or for other purposes, such as inserting into said means for conveying fluids means for regulating or measuring fluid flow.

In an alternative embodiment, the portion of the connector comprising the inventive composition is that portion of the connector used to join or abut another component of the system for conveying fluids. In such embodiments, the connector may be formed by any appropriate means for forming articles comprising more than one composition such as co-extrusion or co-injection molding.

In another alternative embodiment, the instant invention further provides a system comprising: the connector according to any embodiment disclosed herein; and means for conveying fluids associated with said connector.

In another alternative embodiment, the instant invention further provides a process for improving bonding between two or more means for conveying fluids comprising: selecting a connector in accordance with any embodiment disclosed herein; disposing said connector therebetween at least two or more means for conveying fluids thereby forming a pre-connected system; and subjecting the pre-connected system to a magnetic field to form a bond therebetween said connector and said at least two or more means for conveying fluids.

In an alternative embodiment of the process, only that portion of the connector comprising the composition exhibits a rise in temperature upon exposure to the magnetic field.

In an alternative embodiment, the instant invention provides a composition, a connector, a system comprising said connector and a process for improving bonding between two or more means for conveying fluids in accordance with any of the embodiments disclosed herein, except that the composition, further comprises one or more additive selected from the group consisting of organic and/or inorganic pigments, organic and/or inorganic fillers, dyes, antioxidants, plasticizers, UV absorbers, carbon black, slip agents, fire retardants, and combinations of two or more thereof.

In an alternative embodiment, the instant invention provides a composition, a connector, a system comprising said connector and a process for improving bonding between two or more means for conveying fluids in accordance with any of the embodiments disclosed herein, except that the composition comprises 1 to 3 percent by weight carbon black.

In an alternative embodiment, the instant invention provides a composition, a connector, a system comprising said connector and a process for improving bonding between two or more means for conveying fluids in accordance with any of the embodiments disclosed herein, except that the thermoplastic polymer comprises an ethylene-based polymer, a propylene-based polymer, or a combination thereof.

As used herein, "ethylene-based polymer" includes polyethylene homopolymers, ethylene copolymerized with one or more copolymers, and combinations thereof.

As used herein, "propylene-based polymer" includes polypropylene homopolymers, propylene copolymerized with one or more copolymers, and combinations thereof.

The means for conveying fluids includes pipes, tubings, aqueducts, canals, channels, conduits, ducts, hoses, lines, mains, pipelines, sewers, spouts, troughs, vents, vessels, and combinations of two or more thereof. The means for conveying fluids further includes any pipe suitable for conveying fluids, including without limitation, composite piping, pipe made from thermoplastic polymers, and combinations thereof.

In an alternative embodiment, the instant invention provides a composition, a connector, a system comprising said connector and a process for improving bonding between two or more means for conveying fluids in accordance with any of the embodiments disclosed herein, except that the thermoplastic polymer is selected from the group consisting of polyethylene having a density equal to or greater than 0.940 g/cm$^3$ and crosslinked polyethylene having less than 100% crosslinking density.

In an alternative embodiment, the instant invention provides a composition, a connector, a system comprising said connector and a process for improving bonding between two or more means for conveying fluids in accordance with any of the embodiments disclosed herein, except that the thermoplastic polymer is a propylene-based polymer, such as those commercially available from The Dow Chemical Company under the tradename VERSIFY.

In an alternative embodiment, the instant invention provides a composition, a connector, a system comprising said connector and a process for improving bonding between two or more means for conveying fluids in accordance with any of the embodiments disclosed herein, except that the thermoplastic polymer is a propylene-based polymer having a melting point from 150 and 180° C. All individual values and subranges from 150 to 180° C. are included herein and disclosed herein; for example, the melting point of a propylene-based polymer can be from a lower limit of 150, 155, 160, 165, 170 or 175° C. to an upper limit of 155, 160, 165, 170, 175 or 180° C. For example, the melting point of a propylene-based polymer may be in the range of from 150 and 180° C., or in the alternative, the melting point of a propylene-based polymer may be in the range of from 150 and 175° C., or in the alternative, the melting point of a propylene-based polymer may be in the range of from 165 and 180° C., or in the alternative, the melting point of a propylene-based polymer may be in the range of from 165 and 175° C.

In an alternative embodiment, the instant invention provides a composition, a connector, a system comprising said connector and a process for improving bonding between two or more means for conveying fluids in accordance with any of the embodiments disclosed herein, except that the thermoplastic polymer comprises an ethylene-based polymer which comprises units derived from ethylene and octene.

In an alternative embodiment, the instant invention provides a composition, a connector, a system comprising said connector and a process for improving bonding between two or more means for conveying fluids in accordance with any of the embodiments disclosed herein, except that the thermoplastic polymer is an ethylene-based polymer having a density in the range of from 0.870 to 0.965 g/cm$^3$ and an $I_2$ in the range of from 0.001 to 1000 g/10 minutes.

All individual values and subranges from 0.870 to 0.965 g/cm$^3$ are included herein and disclosed herein; for example, the density can be from a lower limit of 0.870, 0.907, 0.919, 0.928, 0.940, 0.948, 0.957, or 0.960 g/cm$^3$ to an upper limit of 0.885, 0.897, 0.923, 0.936, 0.941, 0.947, 0.954, 0.959, 0.961, 0.962, or 0.965 g/cm$^3$. For example, the ethylene-based polymer may have a density in the range of 0.870 to 0.965 g/cm$^3$; or in the alternative, the ethylene-based polymer may have a density in the range of 0.890 to 0.96 g/cm$^3$; or in the alternative, the ethylene-based polymer may have a density in the range of 0.94 to 0.955 g/cm$^3$; or in the alternative, the ethylene-based polymer may have a density in the range of 0.907 to 0.959 g/cm$^3$; or in the alternative, the ethylene-based polymer may have a density in the range of 0.870 to 0.954 g/cm$^3$; or in the alternative, the ethylene-based polymer may have a density in the range of 0.870 to 0.947 g/cm$^3$; or in the alternative, the ethylene-based polymer may have a density in the range of 0.870 to 0.941 g/cm$^3$; or in the alternative, the ethylene-based polymer may have a density in the range of 0.911 to 0.972 g/cm$^3$; or in the alternative, the ethylene-based polymer may have a density in the range of 0.940 to 0.965 g/cm$^3$; or in the alternative, the ethylene-based polymer may have a density in the range of 0.924 to 0.930 g/cm$^3$; or in the alternative, the ethylene-based polymer may have a density in the range of 0.926 to 0.936 g/cm$^3$; or in the alternative, the ethylene-based polymer may have a density in the range of 0.940 to 0.946 g/cm$^3$; or in the alternative, the ethylene-based polymer may have a density in the range of 0.946 to 0.953 g/cm$^3$; or in the alternative, the ethylene-based polymer may have a density in the range of 0.946 to 0.956 g/cm$^3$; or in the alternative, the ethylene-based polymer may have a density in the range of 0.948 to 0.956 g/cm$^3$; or in the alternative, the ethylene-based polymer may have a density in the range of 0.930 to 0.940 g/cm$^3$.

All individual values and subranges of a melt index ($I_2$) from 0.001 to 1000 g/10 minutes are included herein and disclosed herein; for example, the melt index ($I_2$) can be from a lower limit of 0.001, 0.005, 0.01, 0.05, 0.5, 1, 2, 3, 5, 10, 20, 30, 40, 60, 80, or 100 g/10 minutes, to an upper limit of 0.005, 0.01, 0.02, 0.08, 1.2, 5, 10, 30, 50, 80, 90, 110, 200, 220, 250, 300, 500, 800, or 1000 g/10 minutes. For example, the ethylene-based polymer may have a melt index ($I_2$) in the range of 0.001 to 1000 g/10 minutes; or in the alternative, the ethylene-based polymer may have a melt index ($I_2$) in the range of 0.01 to 100 g/10 minutes; or in the alternative, the ethylene-based polymer may have a melt index ($I_2$) in the range of 0.05 to 0.5 g/10 minutes; or in the alternative, the ethylene-based polymer may have a melt index ($I_2$) in the range of 0.02 to 1 g/10 minutes.

In an alternative embodiment, the instant invention provides a composition, a connector, a system comprising said connector and a process for improving bonding between two or more means for conveying fluids in accordance with any of the embodiments disclosed herein, except that the thermoplastic polymer is an ethylene-based polymer having a melting point from 50 to 140° C.

In an alternative embodiment, the instant invention provides a composition, a connector, a system comprising said connector and a process for improving bonding between two or more means for conveying fluids in accordance with any of the embodiments disclosed herein, except that the thermoplastic polymer is an ethylene-based polymer having a melting point from 100 to 140° C.

All individual values and subranges from 100 to 140° C. are included herein and disclosed herein; for example, the melting temperature of the ethylene-based polymer may range from a lower limit of 100, 105, 110, 115, 120, 125, 130, 135 or 138° C. to an upper limit of 104, 109, 114, 119, 124, 129, 134, 139 or 140° C. For example, the melting point of the ethylene-based polymer may be in the range of from 100 to 140° C., or in the alternative, the melting point of the ethylene-based polymer may be in the range of from 125 to 130° C., or in the alternative, the melting point of the ethylene-based polymer may be in the range of from 120 to 138° C., or in the alternative, the melting point of the ethylene-based polymer may be in the range of from 115 to 140° C.

In an alternative embodiment, the instant invention provides a composition, a connector, a system comprising said connector and a process for improving bonding between two or more means for conveying fluids in accordance with any of the embodiments disclosed herein, except that the thermoplastic polymer is an ethylene-based polymer having a melting point from 100 to 140° C. and is reached by subjecting the pre-pipe to a magnetic field for a time between 5 and 15 seconds.

In an alternative embodiment, the instant invention provides a composition, a connector, a system comprising said connector and a process for improving bonding between two or more means for conveying fluids in accordance with any of the embodiments disclosed herein, except that the thermoplastic polymer is an ethylene-based polymer having a molecular weight distribution (Mw/Mn) in the range of from 1.70 to 35.

All individual values and subranges of a molecular weight distribution ($M_w/M_n$) (measured according to the conventional GPC method) from 1.70 to 35 are included herein and disclosed herein; for example, the molecular weight distribution ($M_w/M_n$) can be from a lower limit of 1.70, 5, 14.9, 17.5, 20, 26.7, 30.1, or 34 to an upper limit of 1.85, 6, 15.5, 18.8, 22, 29.9, or 35. For example, the ethylene-based polymer may have a molecular weight distribution ($M_w/M_n$) in the range of 1.70 to 35; or in the alternative, the ethylene-based polymer may have a molecular weight distribution ($M_w/M_n$) in the range of 1.70 to 15; or in the alternative, the ethylene-based polymer may have a molecular weight distribution ($M_w/M_n$) in the range of 1.70 to 12.5; or in the alternative, the ethylene-based polymer may have a molecular weight distribution ($M_w/M_n$) in the range of 1.70 to 3.6; or in the alternative, the ethylene-based polymer may have a molecular weight distribution ($M_w/M_n$) in the range of 1.70 to 2.95; or in the alternative, the ethylene-based polymer may have a molecular weight distribution ($M_w/M_n$) in the range of 5 to 15; or in the alternative, the ethylene-based polymer may have a molecular weight distribution ($M_w/M_n$) in the range of 5 to 35; or in the alternative, the ethylene-based polymer may have a molecular weight distribution ($M_w/M_n$) in the range of 12.5 to 22.5; or in the alternative, the ethylene-based polymer may have a molecular weight distribution ($M_w/M_n$) in the range of 20 to 35; or in the alternative, the ethylene-based polymer may have a molecular weight distribution ($M_w/M_n$) in the range of 1.70 to 3.6; or in the alternative, the ethylene-based polymer may have a molecular weight distribution ($M_w/M_n$) in the range of 2 to 15.

In an alternative embodiment, the instant invention provides a composition, a connector, a system comprising said connector and a process for improving bonding between two or more means for conveying fluids in accordance with any of the embodiments disclosed herein, except that the thermoplastic polymer is an ethylene-based polymer having a density in the range of 0.925 to 0.960 g/cm$^3$, and a melt index ($I_2$) in the range of 0.03 to 100 g/10 minutes.

In an alternative embodiment, the instant invention provides a composition, a connector, a system comprising said connector and a process for improving bonding between two or more means for conveying fluids in accordance with any of the embodiments disclosed herein, except that the thermoplastic polymer is an ethylene-based polymer having a density in the range of 0.935 to 0.955 g/cm$^3$, and a melt index ($I_2$) in the range of 0.05 to 0.5 g/10 minutes.

In an alternative embodiment, the instant invention provides a composition, a connector, a system comprising said connector and a process for improving bonding between two or more means for conveying fluids in accordance with any of the embodiments disclosed herein, except that the thermoplastic polymer comprises an ethylene-based polymer having a density from 0.915 to 0.945 g/cm$^3$.

In an alternative embodiment, the instant invention provides a composition, a connector, a system comprising said connector and a process for improving bonding between two or more means for conveying fluids in accordance with any of the embodiments disclosed herein, except that the thermoplastic polymer comprises an ethylene-based polymer having an $I_2$ from 0.54 to 8.0.

In an alternative embodiment, the instant invention provides a composition, a connector, a system comprising said connector and a process for improving bonding between two or more means for conveying fluids in accordance with any of the embodiments disclosed herein, except that the shell of the particles which have core-shell structure can be one or more shells surrounding the core.

In an alternative embodiment, the instant invention provides a composition, a connector, a system comprising said connector and a process for improving bonding between two or more means for conveying fluids in accordance with any of the embodiments disclosed herein, except that the one or more shells comprises silicon dioxide.

In an alternative embodiment, the instant invention provides a composition, a connector, a system comprising said connector and a process for improving bonding between two or more means for conveying fluids in accordance with any of the embodiments disclosed herein, except that an outermost shell is perforation-free and consists essentially of silicon dioxide.

In an alternative embodiment, the instant invention provides a composition, a connector, a system comprising said connector and a process for improving bonding between two or more means for conveying fluids in accordance with any of the embodiments disclosed herein, except that the an outermost shell completely encloses or surrounds the core.

In an alternative embodiment, the instant invention provides a composition, a connector, a system comprising said connector and a process for improving bonding between two or more means for conveying fluids in accordance with any of the embodiments disclosed herein, except that the shell comprises more than one shell and the inner shells are not perforation-free.

Such inner shells may comprise compounds composed of the elements involved in the shell material and the elements involved in the core material. By way of example, this can be iron silicate if the core comprises iron or iron compounds.

In an alternative embodiment, the instant invention provides a composition, a connector, a system comprising said connector and a process for improving bonding between two or more means for conveying fluids in accordance with any of the embodiments disclosed herein, except that the thickness of the shell is in the nanometer range.

In an alternative embodiment, the instant invention provides a composition, a connector, a system comprising said connector and a process for improving bonding between two or more means for conveying fluids in accordance with any of the embodiments disclosed herein, except that the thickness of the shell is from 2 to 50 nm. All individual values and subranges from 2 to 50 nm are included herein and disclosed herein; for example, the thickness of the shell can be from a lower limit of 2, 12, 18, 24, 30, 38, 44, or 49 nm to an upper limit of 3, 9, 15, 20, 29, 37, 45 or 50 nm. For example, the shell thickness may be in the range of from 2 to 50 nm, or in the alternative, the shell thickness may be in the range of from 5 to 30 nm, or in the alternative, the shell thickness may be in the range of from 20 to 40 nm, or in the alternative, the shell thickness may be in the range of from 40 to 50 nm.

In an alternative embodiment, the instant invention provides a composition, a connector, a system comprising said connector and a process for improving bonding between two or more means for conveying fluids in accordance with any of the embodiments disclosed herein, except that the shell is substantially pore-free.

In an alternative embodiment, the instant invention provides a composition, a connector, a system comprising said connector and a process for improving bonding between two or more means for conveying fluids in accordance with any of the embodiments disclosed herein, except that the thickness of the shell has free hydroxy groups on the surface.

Magnetic materials useful in embodiments of the invention are paramagnetic, ferromagnetic, ferrimagnetic, or superparamagnetic materials, or a mixture of these. In an alternative embodiment, the instant invention provides a composite material, method of producing the same, articles made therefrom, and method of making such articles, in accordance with any of the preceding embodiments, except that the magnetic material is a selected from the group consisting of superparamagnetic material and materials which have only slight remnant magnetization.

In an alternative embodiment, the instant invention provides a composition, a connector, a system comprising said connector and a process for improving bonding between two or more means for conveying fluids in accordance with any of the embodiments disclosed herein, except that the particles having a core-shell structure comprise superparamagnetic material and further exhibit hysteresis.

In an alternative embodiment, the instant invention provides a composition, a connector, a system comprising said connector, and a process for improving bonding between two or more means for conveying fluids in accordance with any of the embodiment disclosed herein, except that the core of each particle in said plurality of particles (b) comprises an iron oxide.

In an alternative embodiment, the instant invention provides a composition, a connector, a system comprising said connector, and a process for improving bonding between two or more means for conveying fluids in accordance with any of the preceding embodiments, except that the core of each particle in said plurality of particles (b) is selected from the group consisting of Fe, Co and Ni; oxides of Fe, Co and/or Ni, such as $Fe_3O_4$ and gamma-$Fe_2O_3$; spinel-type ferromagnetic materials such as $MgFe_2O_4$, $MnFe_2O_4$ and $CoFe_2O_4$; alloys, such as $CoPt_3$ and FePt; and combinations of two or more thereof.

In an alternative embodiment, the instant invention provides a composition, a connector, a system comprising said connector, and a process for improving bonding between two or more means for conveying fluids in accordance with any of the preceding embodiments, except that the core of each particle in said plurality of particles (b) comprises one or more iron oxides selected from the group consisting of haematite, magnetite and maghemite, or a mixture of two or three of these iron oxides.

In an alternative embodiment, the instant invention provides a composition, a connector, a system comprising said connector and a process for improving bonding between two or more means for conveying fluids in accordance with any of the embodiments disclosed herein, except that the core material consists essentially of one or more iron oxides selected from the group consisting of haematite, magnetite and maghemite, or a mixture of two or three of these iron oxides.

The proportions of core and of shell within the core/shell structure can vary within wide limits as a function of core, of the thickness of the shell, and of the structure of the particles, isolated or aggregated. The proportions of the core and of the shell are generally in each case from 10 to 90% by weight.

All individual values and subranges from 10 to 90 wt % are included herein and disclosed herein; for example, the amount of core in the core/shell structure can be from a lower limit of 10, 20, 30, 40, 50, 60, 70, 80, or 89 wt % to an upper limit of 15, 25, 35, 45, 55, 65, 75, 85 or 90 wt %. For example, the amount of the core in the core/shell structure may be in the range of from 10 to 90 wt %, or in the alternative, the amount of the core in the core/shell structure may be in the range of from 50 to 90 wt %, or in the alternative, the amount of the core in the core/shell structure may be in the range of from 50 to 80 wt %, or in the alternative, the amount of the core in the core/shell structure may be in the range of from 75 to 85 wt %.

Likewise, all individual values and subranges from 10 to 90 wt % with respect to the amount of shell in the core/shell structure are included herein and disclosed herein; for example, the amount of shell in the core/shell structure can be from a lower limit of 10, 20, 30, 40, 50, 60, 70, 80, or 89 wt % to an upper limit of 15, 25, 35, 45, 55, 65, 75, 85 or 90 wt %. For example, the amount of the shell in the core/shell structure may be in the range of from 10 to 90 wt %, or in the alternative, the amount of the shell in the core/shell structure may be in the range of from 10 to 50 wt %, or in the alternative, the amount of the shell in the core/shell structure may be in the range of from 30 to 50 wt %, or in the alternative, the amount of the core in the core/shell structure may be in the range of from 15 to 25 wt %.

In an alternative embodiment, the instant invention provides a composition, a connector, a system comprising said connector, and a process for improving bonding between two or more means for conveying fluids in accordance with any of the preceding embodiments, except that each particle of the plurality of particles (b) comprises from 50 to 90% by weight core and from 10 to 50% by weight shell.

In an alternative embodiment, the instant invention provides a composition, a connector, a system comprising said connector, and a process for improving bonding between two or more means for conveying fluids in accordance with any of the embodiments disclosed herein, except that each said particles of the plurality of particles (b) has an average diameter ranging from 30 to 70 nm. All individual values and subranges from 30 to 70 nm is included herein and disclosed herein; for example, the size of each the particles can be from a lower limit of 30, 40, 50, 60, or 65 nm to an upper limit of 35, 45, 55, 65 or 70 nm. For example, the size of the particles may be in the range of from 30 to 70 nm, or in the alternative, the size of the particles may be in the range of from 30 to 50 nm, or in the alternative, the size of the particles may be in the range of from 50 to 70 nm, or in the alternative, the size of the particles may be in the range of from 40 to 60 nm.

In an alternative embodiment, the instant invention provides a composition, a connector, a system comprising said connector, and a process for improving bonding between two or more means for conveying fluids in accordance with any of the embodiments disclosed herein, except that the plurality of particles (b) are substantially uniformly distributed in the composition.

In an alternative embodiment, the instant invention provides a composition, a connector, a system comprising said connector, and a process for improving bonding between two or more means for conveying fluids in accordance with any of the embodiments disclosed herein, except that the connector is selected from the group consisting of flanges, collars and pipe fittings.

The connector may be integrally formed with the means for conveying fluids or in the alternative, may be a separate device. At least a portion of the connector comprises the composition in accordance with any of the embodiments disclosed herein.

One type of connector in the shape of flange is shown in FIG. 1. The embodiment of a flange 2 as shown in FIG. 1 is integrally formed with a means for conveying fluids 4. Two such means 4 and flanges 2 are shown wherein the flanges are abutted one another. At least that portion of each flange which abuts the other flange, in the embodiment shown in FIG. 1, comprises a composition in accordance with the embodiments disclosed herein. As shown in FIG. 1, a portion of the flange extends beyond the outer diameter of the means for conveying fluids 4. In an alternative embodiment, the flange may be coextensive with the outer diameter of the means for conveying fluids.

Figure 2:
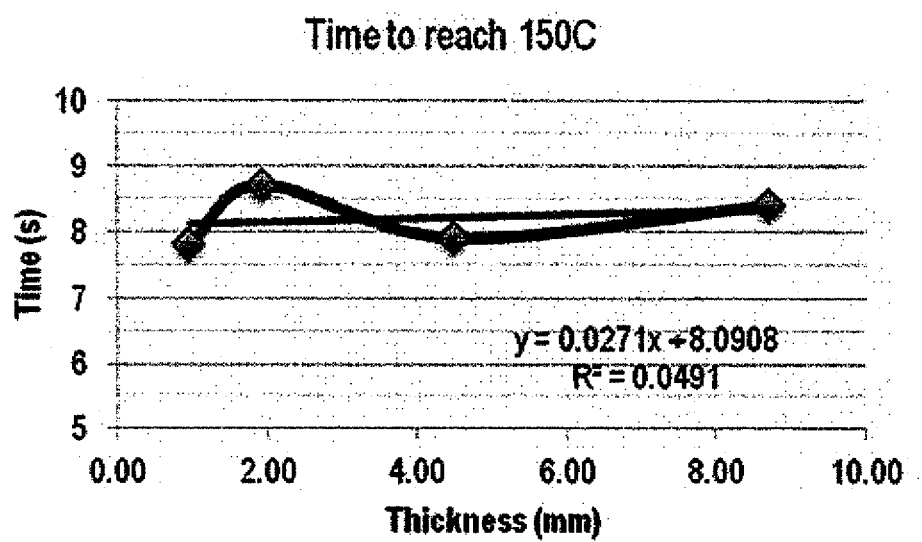
FIG. 2 is a graph illustrating the temperature rise as a function of thickness being subjected to a magnetic field of 600 kHz of compression molded plaques of Inventive Examples 1a-1d.

Another embodiment of a connector is shown in FIG. 2, which illustrate a connector 8 capable of forming a union between up to three means for conveying fluids (not shown).

In an alternative embodiment, the instant invention provides a composition, a connector, a system comprising said connector, and a process for improving bonding between two or more means for conveying fluids in accordance with any of the embodiments disclosed herein, except that the means for conveying fluids associated with said connector is a thermoplastic pipe.

In an alternative embodiment, the instant invention provides a composition, a connector, a system comprising said connector, and a process for improving bonding between two or more means for conveying fluids in accordance with any of the embodiments disclosed herein, except that the the step of subjecting the pre-connected system to a magnetic field occurs for less than one minute.

In an alternative embodiment, the instant invention provides a composition, a connector, a system comprising said connector, and a process for improving bonding between two or more means for conveying fluids in accordance with any of the embodiments disclosed herein, except that the step of subjecting the pre-connected system to a magnetic field occurs for at least 2 seconds.

In an alternative embodiment, the instant invention provides a composition, a connector, a system comprising said connector, and a process for improving bonding between two or more means for conveying fluids in accordance with any of the embodiments disclosed herein, except that the step of subjecting the pre-connected system to a magnetic field occurs for 2 to 20 seconds. All individual values and subranges from 2 to 20 seconds are included herein and disclosed herein; for example, the time of exposure to a magnetic field can be from a lower limit of 2, 3, 5, 7, 9, 11, 13, 15, 17 or 19 seconds to an upper limit of 3, 4, 6, 8, 10, 12, 14, 16, 18 or 20 seconds. For example, the time of exposure to a magnetic field may be in the range of from 2 to 20 seconds, or in the alternative, the time of exposure to a magnetic field may be in the range of from 2 to 10 seconds, or in the alternative, the time of exposure to a magnetic field may be in the range of from 10 to 20 seconds, or in the alternative, the time of exposure to a magnetic field may be in the range of from 5 to 12 seconds.

In an alternative embodiment, the instant invention provides a composition, a connector, a system comprising said connector, and a process for improving bonding between two or more means for conveying fluids in accordance with any of the embodiments disclosed herein, except that the magnetic field has a frequency from 80 kHz to 30 MHz. All individual values and subranges from 80 kHz to 30 MHz are included herein and disclosed herein; for example, the magnetic field may be from a lower limit of 80, 1000, 5000, 10000, 15000, 20000, or 25000 kHz to an upper limit of 100, 1500, 60000, 12500, 17250, 22500, 27500 or 30000 kHz.

In an alternative embodiment, the instant invention provides a composition, a connector, a system comprising said connector, and a process for improving bonding between two or more means for conveying fluids in accordance with any of the embodiments disclosed herein, except that the magnetic field has a frequency from 200 kHz to 2 MHz. All individual values and subranges from 200 kHz to 2 MHz is included herein and disclosed herein; for example, the frequency of the magnetic field may have a lower limit of 250, 350, 450, 550, 650, 750, 850, 950, 1050, 1150, 1250, 1350, 1450, 1550, 1650, 1750, 1850, or 1950 kHz to an upper limit of 300, 400, 500, 600, 700, 800, 900, 1000, 1100, 1200, 1300, 1400, 1500, 1600, 1700, 1800, 1900, or 2000 kHz. For example, the frequency of the magnetic field may be in the range of from 200 kHz to 2 MHz, or in the alternative, the frequency of the magnetic field may be in the range of from 350 kHz to 1 MHz, or in the alternative, the frequency of the magnetic field may be in the range of from 400 kHz to 700 kHz, or in the alternative, the frequency of the magnetic field may be in the range of from 440 kHz to 600 kHz.

In an alternative embodiment, the instant invention provides a composition, a connector, a system comprising said connector, and a process for improving bonding between two or more means for conveying fluids in accordance with any of the embodiments disclosed herein, except that the bonding between the two or more means for conveying fluids can withstand fluid pressures up to 3000 psig. All individual values and subranges of up to 3000 psig are included herein and disclosed herein; for example, the pipe may withstand pressures up to 2500 psig, or in the alternative, the pipe may withstand pressures up to 2000 psig, or in the alternative, the pipe may withstand pressures up to 1500 psig, or in the alternative, the pipe may withstand pressures up to 1000 psig, or in the alternative, the pipe may withstand pressures up to 750 psig.

In an alternative embodiment, the instant invention provides a composition, a connector, a system comprising said connector, and a process for improving bonding between two or more means for conveying fluids in accordance with any of the embodiments disclosed herein, except that system may convey fluids at pressures from 750 to 1500 psig. All individual values and subranges from 750 to 1500 psig are included herein and disclosed herein; for example, the system may convey fluids at pressures from m a lower limit of 750, 900, 1050, 1200, 1350 or 1475 psig to an upper limit of 800, 950, 1100, 1250, 1400, or 1500 psig. For example, the system may convey fluids at a pressure in the range of from 750 to 1500 psig, or in the alternative, the system may convey fluids at a pressure in the range of from 950 to 1500 psig, or in the alternative, the system may convey fluids at a pressure in the range of from 1050 to 1500 psig, or in the alternative, the system may convey fluids at a pressure in the range of from 1150 to 1500 psig, or in the alternative.

The rate of temperature increase of a tape according to the embodiments of the invention disclosed herein may be increased by: (1) increasing the amount of particles (b) used in the composition, and/or (2) by increasing the frequency of the magnetic field to which the tape is subjected.

In an alternative embodiment, the instant invention provides a composition, a connector, a system comprising said connector, and a process for improving bonding between two or more means for conveying fluids in accordance with any of the embodiments disclosed herein, except that the composition consists essentially of: (a) a thermoplastic polymer; (b) a plurality of particles, each said particle having core-shell structure and comprising, (i) a core comprising one or more magnetic materials and (ii) a shell comprising silicon dioxide; wherein the composition comprises particles (b) in an amount from 2 to 15 wt %.

In an alternative embodiment, the instant invention provides a composition, a connector, a system comprising said connector, and a process for improving bonding between two or more means for conveying fluids in accordance with any of the embodiments disclosed herein, except that the composition comprises: (a) a thermoplastic polymer; (b) a plurality of particles, each said particle having core-shell structure which consists essentially of (i) a core comprising one or more magnetic materials and (ii) a shell comprising silicon dioxide; wherein the composition comprises particles (b) in an amount from 2 to 15 wt %.

In an alternative embodiment, the instant invention provides a composition, a connector, a system comprising said connector, and a process for improving bonding between two or more means for conveying fluids in accordance with any of the embodiments disclosed herein, except that the thermoplastic polymer consists essentially of an ethylene-based polymer having a density from 0.935 to 0.955 g/cm3 and an $I_2$ from 0.54 to 0.56.

In an alternative embodiment, the instant invention provides a composition, a connector, a system comprising said connector, and a process for improving bonding between two or more means for conveying fluids in accordance with any of the embodiments disclosed herein, except that the process for improving bonding between two or more means for conveying fluids consists essentially of selecting a connector in accordance any of the foregoing embodiments, disposing said connector abutting, adjacent or in at least one means for conveying fluids thereby forming a pre-connected system; and subjecting the pre-connected system to a magnetic field to form a bond between said connector and said at least one more means for conveying fluids.

EXAMPLES

The following examples illustrate the present invention but are not intended to limit the scope of the invention.

Inventive Examples 1a-1d were compression molded plaques formed from 5% MAGSILICA 300 (available from Evonik Industries) in DOWLEX 2388 (a polyethylene having an $I_2$ of 0.55 g/10 min, and a density of 0.941 g/cm$^3$, commercially available from The Dow Chemical Company). Inventive Example 1a-1d had thicknesses of 0.96 mm, 1.93 mm, 4.49 mm, and 8.72 mm, respectively. Table 1 below provides the time to heat each of Inventive Examples 1a-1d to 150° C. upon exposure to a magnetic field of 1 MHz.

Table 2 below shows the times needed to heat pipe, having a variety of diameters, as shown in Table 2. The pipes were all SDR 11, meaning that the outside pipe diameter is 11 times as thick as the pipe wall. The pipes were made from DOWLEX PE-RT 2377, an ethylene/1-octene copolymer having an $I_2$ of 0.54 g/10 min (ISO 1133) and a density of 0.941 g/cm$^3$ (ISO 1183), which is commercially available from The Dow Chemical Company. As can be seen, as the pipe diameter increases, greater amounts of time are required to raise the pipe temperature, corresponding to times which would be required to weld connectors onto the pipe using radiative or conductive heating, i.e., the time required to melt the pipe. In each of the comparative examples shown in Table 2, heat was applied conductively by infrared heating around the pipes. As can be seen in Table 2, times for softening and/or melting plastics in order to heat weld a connector, under the conditions shown in Table 2, range from 70 to 560 seconds.

Test Methods

Test methods include the following:

Density of ethylene-based polymers were measured according to ISO 1183.

$I_2$ of the ethylene-based polymers were measured according to ISO 1133.

Density of propylene-based polymers were measured according to ASTM D792.

Melt temperature and crystallization temperature are measured via Differential Scanning calorimetry (DSC). All of the results reported here are generated via a TA Instruments Model Q1000 DSC equipped with an RCS (refrigerated cooling system) cooling accessory and an auto sampler. A nitrogen purge gas flow of 50 ml/min was used throughout. The sample is pressed into a thin film using a press at 175° C. and 1500 psi (10.3 MPa) maximum pressure for about 15 seconds, then air-cooled to room temperature at atmospheric pressure. About 3 to 10 mg of material is then cut into a 6 mm diameter disk using a paper hole punch, weighed to the nearest 0.001 mg, placed in a light aluminum pan (about 50 mg) and then crimped shut. The thermal behavior of the sample is investigated with the following temperature profile: The sample was rapidly heated to 180° C. and held isothermal for 3 minutes in order to remove any previous thermal history. The sample is then cooled to −40° C. at 10° C./min cooling rate and was held at −40° C. for 3 minutes. The sample is then heated to 150° C. at 10° C./min heating rate. The cooling and second heating curves are recorded.

The molecular weight distributions of the ethylene polymers were determined by gel permeation chromatography (GPC). The chromatographic system consisted of a Waters (Millford, Mass.) 150° C. high temperature gel permeation chromatograph, equipped with a Precision Detectors (Amherst, Mass.) 2-angle laser light scattering detector Model 2040. The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories. The carousel compartment was operated at 140° C. and the column compartment was operated at 150° C. The columns used were four Shodex HT 806M 300 mm, 13 μm columns and one Shodex HT803M 150 mm, 12 μm column. The solvent used was 1,2,4 trichlorobenzene. The samples were prepared at a concentration of 0.1 grams of polymer in 50 milliliters of solvent. The chromatographic solvent and the sample preparation solvent contained 200 μg/g of butylated hydroxytoluene (BHT). Both solvent sources were nitrogen sparged. Polyethylene samples were stirred gently at 160° C. for 4 hours. The injection volume used was 200 microliters, and the flow rate was 0.67 milliliters/min. Calibration of the GPC column set was performed with 21 narrow molecular weight distribution polystyrene standards, with molecular weights ranging from 580 to 8,400,000 g/mol, which were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first, and in order of decreasing highest molecular weight component, to minimize degradation. The polystyrene standard peak molecular weights were converted to polyethylene molecular weights using the following equation (as described in Williams and Ward, *J. Polym. Sci., Polym. Let.,* 6, 621 (1968)):

$$M\text{polyethylene} = A \times (M\text{polystyrene})^B,$$

where M is the molecular weight, A has a value of 0.41 and B is equal to 1.0. The Systematic Approach for the determination of multi-detector offsets was done in a manner consistent with that published by Balke, Mourey, et al. (Mourey and Balke, *Chromatography Polym.* Chpt 12, (1992) and Balke, Thitiratsakul, Lew, Cheung, Mourey, *Chromatography Polym.* Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., *J. Chem. Phys.,* 16, 1099 (1948)) and Kratochvil (Kratochvil, P., *Classical Light Scattering from Polymer Solutions,* Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight, which was measured in reference to NIST polyethylene homopolymer standard 1475. The chromatographic concentrations were assumed low enough to eliminate addressing $2^{nd}$ Virial coefficient effects (concentration effects on molecular weight). Molecular weight calculations were performed using in-house software. The calculation of the number-average molecular weight, weight-average molecular weight, and z-average molecular weight were made according to the following equations, assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline-subtracted light scattering signal can be substituted for the product of weight average molecular weight and weight fraction in equation (2) below:

$$a)\ \overline{Mn} = \frac{\sum_i Wf_i}{\sum_i \left(\frac{Wf_i}{M_i}\right)} \quad (2)$$

b) $\overline{Mw} = \dfrac{\sum\limits_i (Wf_i * M_i)}{\sum\limits_i Wf_i}$ c) $\overline{Mz} = \dfrac{\sum\limits_i (Wf_i * M_i^2)}{\sum\limits_i (Wf_i * M_i)}$ Monomodal distribution was characterized according to the weight fraction of the highest temperature peak in temperature rising elution fractionation (typically abbreviated as "TREF") data as described, for example, in Wild et al., *Journal of Polymer Science, Poly. Phys. Ed.*, Vol. 20, p. 441 (1982), in U.S. Pat. No. 4,798,081 (Hazlitt et al.), or in U.S. Pat. No. 5,089,321 (Chum et al.), the disclosures of all of which are incorporated herein by reference. In analytical temperature rising elution fractionation analysis (as described in U.S. Pat. No. 4,798,081 and abbreviated herein as "ATREF"), the composition to be analyzed is dissolved in a suitable hot solvent (for example, 1,2,4 trichlorobenzene), and allowed to crystallized in a column containing an inert support (for example, stainless steel shot) by slowly reducing the temperature. The column was equipped with both an infra-red detector and a differential viscometer (DV) detector. An ATREF-DV chromatogram curve was then generated by eluting the crystallized polymer sample from the column by slowly increasing the temperature of the eluting solvent (1,2,4 trichlorobenzene). The ATREF-DV method is described in further detail in WO 99/14271, the disclosure of which is incorporated herein by reference.

The present invention may be embodied in other forms without departing from the spirit and the essential attributes thereof, and, accordingly, reference should be made to the appended claims, rather than to the foregoing specification, as indicating the scope of the invention.

TABLES

TABLE 1

| Example | Thickness (mm) | Time (s) |
| --- | --- | --- |
| Inventive Example 1a | 0.96 | 7.8 |
| Inventive Example 1b | 1.93 | 8.7 |
| Inventive Example 1c | 4.49 | 7.9 |
| Inventive Example 1d | 8.72 | 8.4 |

TABLE 2

| Diameter of pipe, mm | Time of heating at 210° C. (sec.) | Time of cooling under pressure (seconds.) | Pressure (Bar) |
| --- | --- | --- | --- |
| 90 | 70 | 300 | 4.0 |
| 110 | 90 | 330 | 4.7 |
| 125 | 95 | 350 | 5.5 |
| 140 | 110 | 420 | 6.4 |
| 160 | 120 | 480 | 7.7 |
| 180 | 140 | 500 | 9.2 |
| 200 | 200 | 600 | 10.8 |
| 225 | 220 | 720 | 13.2 |
| 250 | 240 | 780 | 15.8 |
| 280 | 290 | 900 | 19.3 |
| 315 | 305 | 960 | 23.8 |
| 355 | 360 | 1000 | 28.0 |
| 400 | 400 | 1060 | 28.7 |
| 450 | 440 | 1200 | 30.9 |
| 500 | 480 | 1500 | 35.0 |
| 560 | 505 | 1650 | 40.0 |
| 630 | 560 | 1800 | 47.2 |

We claim:

1. A connector, wherein at least a portion of the connector comprises:
 a composition which comprises
 (a) a thermoplastic polymer comprising an ethylene-based polymer comprising units derived from ethylene and octene, and the ethylene-based polymer has a melt index, $I_2$, from 0.001 g/10 min to 5 g/10 min, a density from 0.919 g/cm$^3$ to 0.959 g/cm$^3$, and a melting point from 115° C. to 140° C.;
 (b) a plurality of particles, each said particle having a core-shell structure and comprising,
 (i) a core comprising one or more magnetic materials and
 (ii) a shell comprising silicon dioxide;
 wherein the composition comprises particles (b) in an amount from 2 to 15 wt %;
 wherein the connector is a first flange integral to a first thermoplastic pipe at an end of the first pipe; and
 the first flange abuts and is bonded to a second flange integral to a second thermoplastic pipe at an end of the second pipe.

2. The connector according to claim 1, wherein the composition further comprises one or more additive selected from the group consisting of organic and/or inorganic pigments, organic and/or inorganic fillers, dyes, antioxidants, plasticizers, UV absorbers, carbon black, slip agents, fire retardants, and combinations of two or more thereof.

3. The connector according to claim 1, wherein the cores of the particles comprise an iron oxide.

4. The connector according to claim 1, wherein the particles (b) have an average diameter ranging from 30 to 70 nm.

5. The composition according to claim 1, wherein the ethylene-based polymer has a melt index, $I_2$, from 0.05 to 0.5 g/10 min.

6. The composition according to claim 5, wherein the ethylene-based polymer has a density from 0.935 to 0.955 g/cm$^3$.

7. The composition according to claim 1, wherein the ethylene-based polymer has a melt index, $I_2$, from 0.54 g/10 min to 0.56 g/10 min.

8. The connector of claim 1, wherein the bonding between the first flange and the second flange can withstand fluid pressures up to 3,000 psig.

* * * * *